United States Patent
Ehrensberger et al.

(10) Patent No.: US 9,212,824 B2
(45) Date of Patent: Dec. 15, 2015

(54) FILTER UNIT FOR AN EXTRACTOR HOOD

(75) Inventors: Julia Ehrensberger, München (DE); Ralf Grobleben, Bretten (DE); Sándor Klunker, München (DE); Thomas Kotlinski, München (DE); Oliver Kraemer, München (DE); Daniel Metz, Karlsdorf-Neuthard (DE); Christoph Ortmann, München (DE); Udo Reiff, Knittlingen (DE); Volkmar Uebele, Bad Nauheim (DE)

(73) Assignee: BSH Hausgeraete GmbH, Munich (DE)

( * ) Notice: Subject to any disclaimer, the term of this patent is extended or adjusted under 35 U.S.C. 154(b) by 732 days.

(21) Appl. No.: 13/443,160

(22) Filed: Apr. 10, 2012

(65) Prior Publication Data

US 2012/0255267 A1    Oct. 11, 2012

(30) Foreign Application Priority Data

Apr. 11, 2011    (DE) .......................... 10 2011 007 165

(51) Int. Cl.
| | | |
|---|---|---|
| *B01D 50/00* | (2006.01) | |
| *F24C 15/20* | (2006.01) | |
| *B01D 45/08* | (2006.01) | |
| *B01D 46/10* | (2006.01) | |
| *B01D 46/00* | (2006.01) | |
| *B01D 45/12* | (2006.01) | |

(52) U.S. Cl.
CPC ............ *F24C 15/2035* (2013.01); *B01D 45/08* (2013.01); *B01D 45/12* (2013.01); *B01D 46/0005* (2013.01); *B01D 46/10* (2013.01); *B01D 50/002* (2013.01)

(58) Field of Classification Search
CPC ...... B01D 50/002; B01D 45/08; B01D 46/10; B01D 46/0005; B01D 45/12; F24C 15/2035
USPC ....... 55/320, 385.7, 332, 321, 385.4, DIG. 36
See application file for complete search history.

(56) References Cited

U.S. PATENT DOCUMENTS

| | | | |
|---|---|---|---|
| 3,566,585 A * | 3/1971 | Voloshen et al. ................ | 55/435 |
| 4,334,899 A * | 6/1982 | McConnell ..................... | 55/321 |
| 4,610,705 A | 9/1986 | Sarnosky et al. | |
| 2003/0101700 A1 * | 6/2003 | Burdine et al. ............... | 55/385.2 |
| 2005/0022482 A1 * | 2/2005 | Bockle et al. .................. | 55/321 |

FOREIGN PATENT DOCUMENTS

| | | |
|---|---|---|
| DE | 1932824 U | 2/1966 |
| EP | 1231436 A1 | 8/2002 |
| EP | 1855059 A2 | 11/2007 |
| EP | 2172711 A1 | 4/2010 |
| WO | 2009130127 A1 | 10/2009 |

OTHER PUBLICATIONS

Report of Examination EP 12 162 869.7 dated Jan. 6, 2014.
European Search Report EP 12 16 2869.

* cited by examiner

*Primary Examiner* — Dung H Bui
(74) *Attorney, Agent, or Firm* — James E. Howard; Andre Pallapies

(57) ABSTRACT

A filter unit for an extractor hood includes at least one filter element, and at least one protection plate which is arranged in a flow direction upstream of the filter element. The protection plate is made of at least two layers and can have a thickness in a range of 0.5 mm to 10 mm.

23 Claims, 4 Drawing Sheets

FILTER UNIT FOR AN EXTRACTOR HOOD

BACKGROUND OF THE INVENTION

The invention relates to a filter unit for an extractor hood.

Extractor hoods are known in which a plate known as a baffle plate is arranged in front of the actual grease filter, which may be for example a metal mesh filter. The baffle plate is fixed at a defined, sufficiently great distance from the grease filter directly on the viewing hood of the extractor hood. This type of fixture allows the vapor to flow along the edge of the baffle plate and arrive at the grease filter. This achieves the deflection required for cleaning the vapor or, as the case may be, creates the necessary turbulence in the vapor. Filter units in which the vapor is cleaned in this way are also referred to as perimetric extraction filters.

Furthermore, in an earlier application there has been proposed a filter unit for an extractor hood which has at least one filter element which in turn has at least one filter and at least one filter retaining fixture. At least one protection plate is detachably fixed to the filter element. In this solution the protection plate is made of glass or metal.

Although a baffle plate of the filter element can be protected from mechanical and thermal damage as well as against contaminants by means of said protection plate, said filter unit has a number of disadvantages. For one thing, the weight of the protection plate is heavy on account of said materials. Another drawback is that in general protection plates made of said materials are not elastically deformable.

BRIEF SUMMARY OF THE INVENTION

It is therefore an object of the present invention to create a filter unit, in particular a perimetric extraction filter, which does not have these disadvantages of the prior art, yet nonetheless provides a reliable form of protection for a baffle plate of the filter element.

The invention is based on the recognition that this object can be achieved through the use of a protection plate that is made of at least two layers.

The object is therefore achieved according to the invention by means of a filter unit for an extractor hood, said filter unit having at least one filter element and at least one protection plate arranged upstream of the filter element in the flow direction. The filter unit is characterized in that the protection plate is made of at least two layers.

A filter element, within the meaning of the present invention, is understood to be preferably a perimetric extraction filter element having a baffle plate, the baffle plate being part of the filter element. The filter element preferably has a filter and a filter retaining fixture. In this arrangement the baffle plate constitutes a part of the filter retaining fixture. However, filter elements in which for example a baffle plate is present as a separate component from the filter element are also covered by the present invention. Accordingly, a baffle plate of the filter element is understood in the following to mean not only a baffle plate which constitutes a part of the filter element, but also a separate baffle plate which is arranged upstream of the filter element in the flow direction. The protection plate is preferably fixed on the baffle plate of the filter element.

A protection plate arranged upstream of the filter element in the flow direction is understood within the meaning of the present invention to refer to a protection plate which is reached by fumes and vapors flowing toward the extractor hood before said fumes and vapors reach other parts of the filter element. For this arrangement the protection plate can be secured for example to a baffle plate of the filter element.

A protection plate is understood within the meaning of the present invention to denote a planar component which constitutes a protective device for the filter element, in particular for the baffle plate of the filter element, or for a separate baffle plate arranged upstream of the filter element in the flow direction. The protection plate is arranged on the filter element in such a way that in the assembled state of the extractor hood it is positioned on the filter element between the filter element and a cooktop located below the extractor hood. With such a positioning arrangement the filter element can be protected by the protection plate for example against contaminants or the like which could be deposited due to the fumes and vapors flowing against its underside. Furthermore, the filter element and in particular the baffle plate are also protected by the protection plate against chemical and mechanical damage. Such chemical and mechanical damage can occur for example when the filter element is cleaned, in a dishwashing machine for example.

The protection plate preferably corresponds in size to the size of the baffle plate of the filter element. Particularly preferably, the size of the protection plate is in this case slightly larger than the size of the baffle plate. Because the size of the protection plate is at least equivalent to the size of the baffle plate, on the one hand the entire surface area of the baffle plate is covered by the protection plate and consequently can be protected. On the other hand, owing to this large dimension of the protection plate it is also possible to ensure a reliable fixing of the protection plate to the filter element and in particular to the baffle plate of the filter element.

A protection plate is preferably a flat, planar component. Planar is to be understood in this context as meaning that two surface area dimensions of the protection plate are significantly greater than the third surface area dimension. Thus, the width and the length of the protection plate in particular are significantly greater than the thickness or the height of the protection plate. In contrast to the flat shape, however, the protection plate can also have a three-dimensional contour, for example a curved shape. The shape of the protection plate is preferably matched to the shape of the underside of the filter element, in particular of the baffle plate.

Since the protection plate is made of at least two layers, the required characteristics of the protection plate can be reliably selected. Thus, for example, it is possible to produce a requisite stiffness of the protection plate by means of one of the at least two layers. The surface properties of the protection plate for example can be set by means of another of the layers. In particular the at least one further layer can protect against contaminants such as grease diffusing into the other layers. Because the protection plate is made of multiple layers, properties of the protection plate such as weight and elastic deformability can also be selectively set through the choice of suitable materials and the choice of suitable thicknesses for the individual layers.

According to one embodiment variant, at least one of the layers constitutes a coating covering the at least one further layer. In this embodiment variant, the protection plate includes a carrier layer which is coated on at least one side with a coating material. The carrier layer is also referred to as a base layer. The coating layer, which is also referred to simply as the coating, preferably covers the entire surface area of the carrier layer at least on one side of the carrier layer. It is also possible for the protection plate to be made of a carrier layer and two coating layers. In this case the top side and the underside of the carrier layer are each provided with a coating. The coating can also enclose the carrier layer completely, in other words also cover the edges or perimeter.

The advantage of using a coating resides in particular in that the protection plate is easier to manufacture. The coating can be applied by dip coating, for example. Other coating methods, such as spray coating, are also possible, however. Furthermore, the thickness of the coating layer is small, in particular smaller than the thickness of the carrier layer. This means that for a predetermined thickness of the protection plate the greatest part of the thickness can be formed by the carrier layer. This can be made, for example, of a hard, dimensionally stable material. The coating can in this case serve to ensure the scratch resistance of the protection plate or to prevent chemical reactions of the material of the carrier layer. The thermal resistance of the protection plate, for example, can also be increased by means of the coating. The carrier layer is preferably coated on one side. In this case the coating is applied on the underside of the carrier layer. The coating is accordingly then present on the side of the protection plate impinged upon by the vapor flow. The coating process can on the one hand seal the surface of the carrier layer to prevent fats and grease diffusing into it and on the other hand provide protection against mechanical damage.

It has been demonstrated that the thickness of the coating layer can be small and that the desired properties can nonetheless be set on the protection plate. Preferably the thickness of the coating layer lies in the range of 2 to 20 μm, particularly preferably in the range of 4 to 10 μm. On the one hand this small thickness of the coating layer enables the amount of material required and hence the costs to be kept low. On the other hand such a small layer thickness is of advantage in particular also when a carrier layer is coated completely. With said complete coating, not just the top side and underside of the carrier or base layer are provided with the coating, but also the edges of the carrier or base layer. As a result the thickness of the coating layer affects the width or depth of the protection plate. In particular in the case of devices in which ultrasound functions are used in the extractor hood, it is, however, the dimension of the gap by way of which the perimetric extraction is realized that is of major importance. If the protection plate projects beyond the edges of the baffle plate of the filter element, it protrudes into the gap that is available for the perimetric extraction. Consequently, the smaller the increase in width and depth due to the coating layer, the less the gap width will be reduced and the ultrasound functions can be used to optimal effect.

According to a preferred embodiment variant, one of the layers of the protection plate is made of a polycarbonate. Preferably the layer made of this synthetic material is the carrier layer, which can be provided with a coating. Polycarbonate has proven to be a suitable material because it is not only inexpensive, but also has high strength and rigidity. This means that a protection plate having a large surface area can be fabricated even with a relatively small thickness of the carrier layer. With this solution the weight of the protection plate is low in comparison with a glass or metal plate. Furthermore, polycarbonate has the advantage that it can be colored. In particular in the case of extractor hoods in which the filter elements are mounted obliquely, referred to as headroom or angled chimney hoods, the baffle plate of the filter element is generally visible to the user of the extractor hood. Accordingly, a protection plate affixed to the filter element is also visible. By coloring the carrier layer it is therefore possible to alter the visual impression of the extractor hood, i.e. design aspects in particular can be taken into account. Polycarbonate is also a transparent material, so the ability to see the metal surface of the baffle plate can also be guaranteed after the protection plate has been attached.

The protection plate preferably includes a polysiloxane layer, which is also referred to as a silicone hard coating. This layer preferably constitutes a coating layer which is applied on a carrier layer. In this case the carrier layer is particularly preferably a polycarbonate layer. Although polycarbonate has the aforementioned advantages, this material also has disadvantages when used as a protection plate on a filter element. Firstly, polycarbonate is susceptible to scratching and has a tendency to form stress cracks. Secondly, contaminants such as fats or grease can diffuse into the polycarbonate. Finally, polycarbonate is inflammable. These disadvantages can be eliminated or at least mitigated through the use of a silicone hard coating layer. Reducing the flammability of the protection plate and preventing contaminants from penetrating are especially important in particular with regard to the installation site of the protection plate according to the invention. The filter unit is provided in the extractor hood above the cooktop. This is the point impinged upon by the fumes and vapors rising from cooking pots. Furthermore, the protection plate is also subjected to high temperatures at this installation site as well as being directly exposed to flames, for example when flambé dishes are being prepared. Moreover, the surface tension is low in the case of a silicone hard coating and in addition said coating is characterized by a low polarity.

According to the invention it is possible to use a film as one of the layers. The film can represent a coating layer. According to an embodiment variant of the invention, however, the film constitutes a carrier layer, at least one side of which is provided with a coating. In this embodiment the material requirements and consequently also the costs associated with the production are minimized on the one hand. On the other hand the protection plate has a minimal weight in this embodiment variant. Owing to the low weight, but also owing to a certain flexibility produced as a result of the small thickness of a film, certain advantages can be achieved with this embodiment variant of the protection plate. For example, the protection plate can be fastened to the filter element by way of simple fixing means, such as adhesive strips.

The thickness of the protection plate can be chosen according to requirements. The protection plate can for example have a thickness in the range of 0.5 mm to 10 mm. If a film is used as the carrier layer, the overall thickness of the protection plate can lie in the range of 0.5 mm to 1 mm. If, on the other hand, a thicker carrier layer in the form of a plate or panel is used, the thickness can lie in the range of 3 to 6 mm.

The protection plate, which can also be referred to as a panel, is float-mounted on the filter element so that no mechanical stresses can act on the material, in particular the material of the carrier layer and/or of the coating, and consequently no stress fractures are likely to occur.

The protection plate can be removably or permanently fixed to the filter element. In this context an adhesive bond, for example, is understood to mean a permanent join. A snap-on, push-fit or plug-in connection is preferably used as a removable join.

In particular in the case of a protection plate which constitutes a sheet product, inserting the plate for example by way of the filter element on the baffle plate by means of U-profiles formed at the sides of the plate can be used as a fixing technique. According to the invention the protection plate can alternatively be fixed, for example, also by means of double-sided adhesive tape. The adhesive tape is in this case preferably closed-cell tape to prevent moisture penetration and sealed externally by means of silicone adhesive in order to increase the dishwasher resistance of the arrangement. If the protection plate is a film, this is preferably fixed by means of double-sided adhesive tape and sealed by means of silicone adhesive as described. These types of attachment ensure a float-mounted fixing of the protection plate, as a result of which allowance can also be made for different coefficients of expansion of the materials of the protection plate and the baffle plate.

According to one embodiment variant, the protection plate is joined to the baffle plate of the filter element by means of an adhesive bond. A fixing of such type is possible owing to the inventive structure of the protection plate and the resulting adjustable properties of the protection plate, such as a low weight, for example. The adhesive bond can be produced for example through the use of a double-sided adhesive film which is applied onto one side of the protection plate. In this case the adhesive film can be adhesive strips which cover only a part of the surface area of the protection plate. It is, however, also possible to provide the entire surface area of the protection plate with an adhesive film on one side. Alternatively to the use of an adhesive film, adhesive can also be applied directly onto the protection plate. If an adhesive film is used, including in the form of adhesive strips or tapes, these are preferably sealed at the edges by means of silicone adhesive. In addition or alternatively, a silicone adhesive can be introduced at the edge of the baffle plate of the filter element between the baffle plate and the protection plate in order thereby to seal the entire space between the two plates. An advantage of this sealing means is that the adhesive bond between the two plates will not be loosened by penetrating moisture. Accordingly, the filter unit in which the protection plate is fixed by means of an adhesive bond can be cleaned for example in a dishwasher. Positioning elements by means of which the alignment of the protection plate relative to the baffle plate can be ensured can be provided on the protection plate in addition to the adhesive bond.

According to another embodiment variant, the protection plate is fixed to the baffle plate of the filter element by way of a snap-fit connection. This type of join has the advantage that the connection between the protection plate and the filter element, in particular the baffle plate, can be released as necessary, for example for cleaning purposes or in order to replace a protection plate. The snap-fit elements for establishing the snap-fit connection, in particular snap-fit projections or hooks, can be attached to the filter element. However, at least one snap-fit element is preferably embodied or glued in place on one side of the protection plate. This arrangement of the snap-fit elements has the advantage that the latter cannot be seen by the user of the extractor hood. The snap-fit elements are preferably provided on the side of the protection plate which, in the assembled state, faces toward the filter element and hence the baffle plate. The snap-fit elements can be embodied as a single piece with the protection plate. Alternatively, however, the snap-fit elements can also be adhesively attached to the protection plate.

The snap-fit elements are preferably provided on the protection plate in the region of the edge of the protection plate on the top side of the protection plate. The size of the protection plate corresponds to the size of the baffle plate of the filter element and is preferably slightly larger than the baffle plate. This means that the snap-fit elements arranged in the edge region can lie in the overhang of the protection plate over the baffle plate and therefore grip around the baffle plate. Since there is provided between the baffle plate and the actual filter of the filter element a part of the filter retaining fixture in which slots or other apertures are normally provided which enable perimetric extraction by means of the filter element, the snap-fit elements can preferably engage in said slots or apertures. There is consequently no need to incorporate additional apertures in the filter element.

BRIEF DESCRIPTION OF THE DRAWINGS

The invention is explained again below with reference to the accompanying drawings, in which.

DETAILED DESCRIPTION OF EXEMPLARY EMBODIMENTS OF THE PRESENT INVENTION

Figure 1:
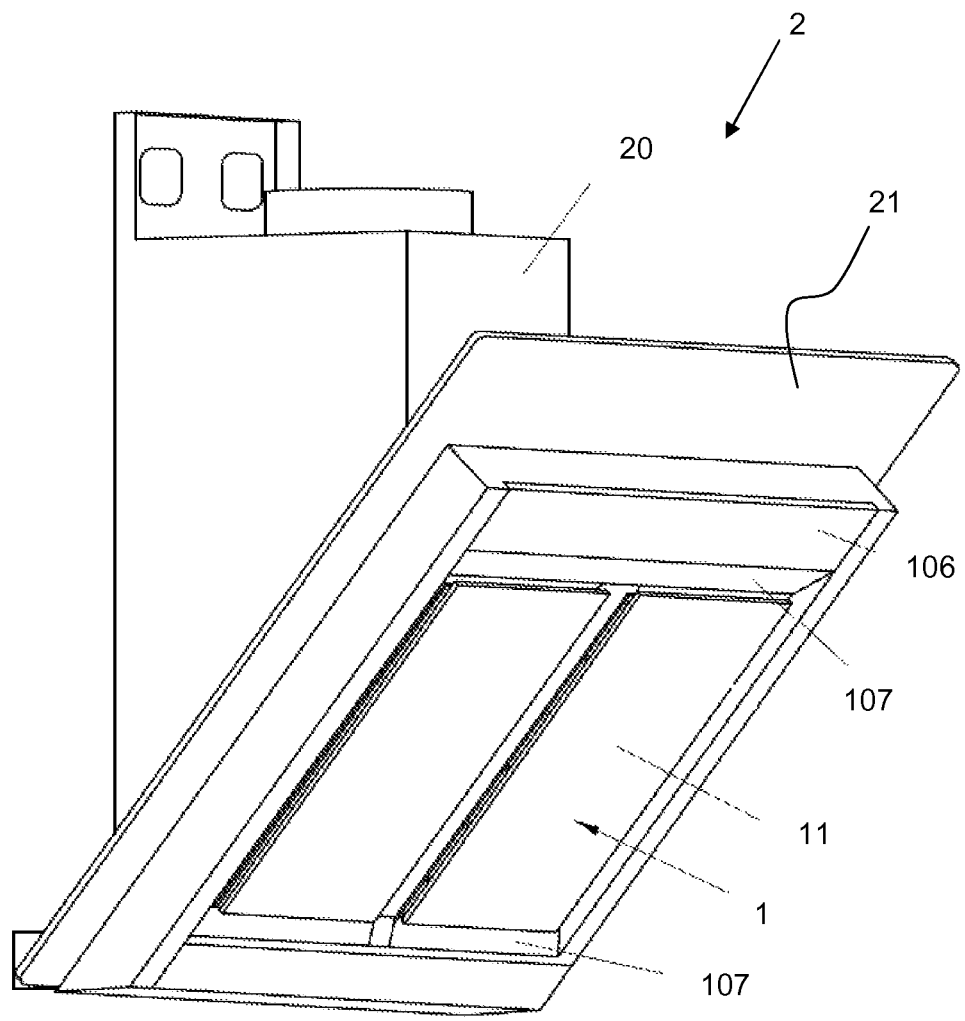
FIG. 1: shows a schematic perspective view of an extractor hood having two filter units according to one embodiment variant of the present invention.

FIG. 1 shows an extractor hood 2 representing an angled chimney hood. The extractor hood 2 includes a chimney 20 and a viewing hood 21 directed obliquely upward below the chimney 20. Accommodated in the underside of the viewing hood 21 are two filter units 1. Parts of the filter units 1 that can be seen in the view shown in FIG. 1 are in each case the protection plate 11, the frame 106 and the perimetric extraction gap 107.

Figure 2:
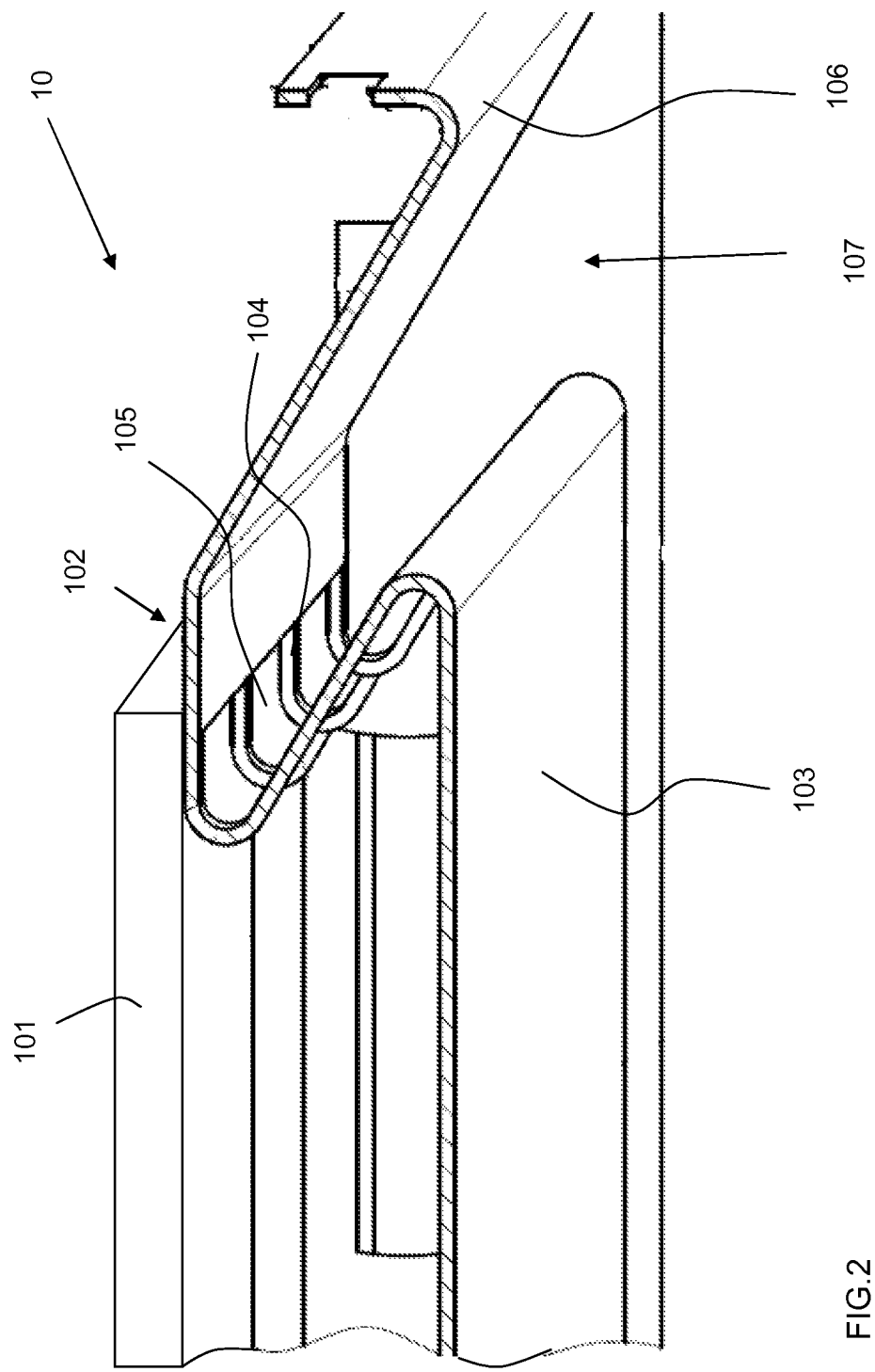
FIG. 2: shows a schematic view of the edge region of an embodiment variant of a filter element of the filter unit according to the invention.

FIG. 2 shows an embodiment variant of a filter element 10 on which a protection plate (not shown) can be provided. The filter element 10 includes a filter 101 which is retained on a filter retaining fixture 102. The filter retaining fixture 102 comprises a baffle plate 103 which is connected to the region of the filter retaining fixture 102 on which the filter 101 is retained by way of inclined, upward-directed webs 104 between which gaps or apertures 105 exist. Starting from this region a connecting zone extends obliquely downward and transitions into a frame 106 approximately at the level of the baffle plate 103. Between the outer edge of the baffle plate 103 and the frame 106 there is thus formed a perimetric extraction gap 107 via which fumes and vapors can reach the apertures 105 and pass through the latter to the filter 101.

Figure 3:
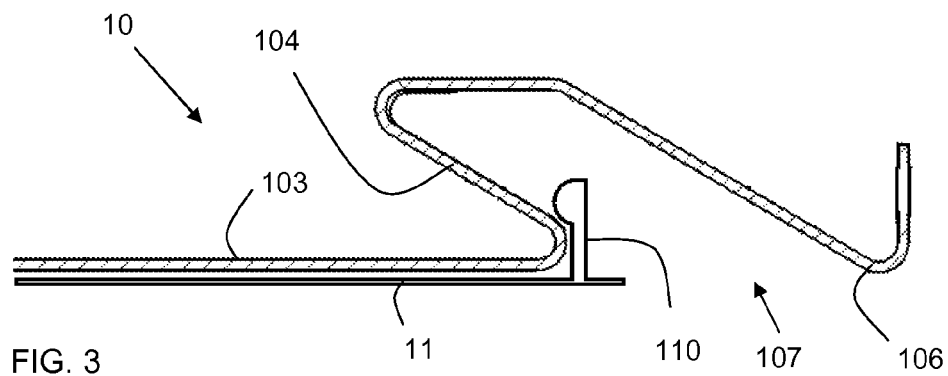
FIG. 3: shows a schematic view of an embodiment variant of the filter element according to the invention.
Figure 4:
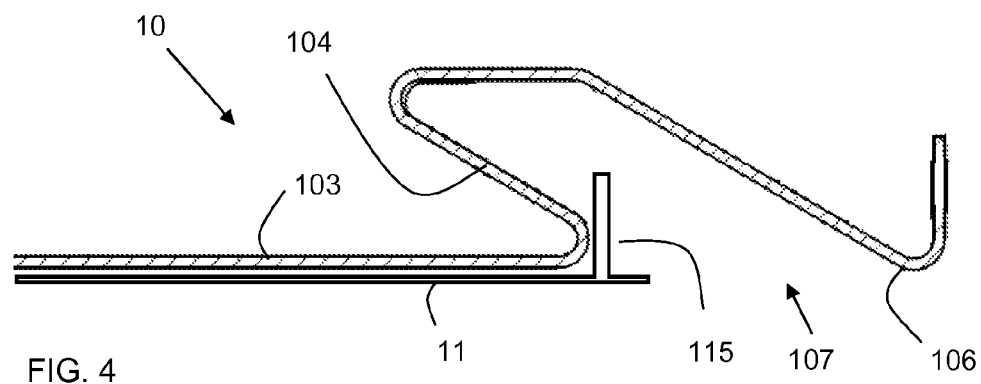
FIG. 4: shows a schematic view of a further embodiment variant of the filter element according to the invention.
Figure 5:
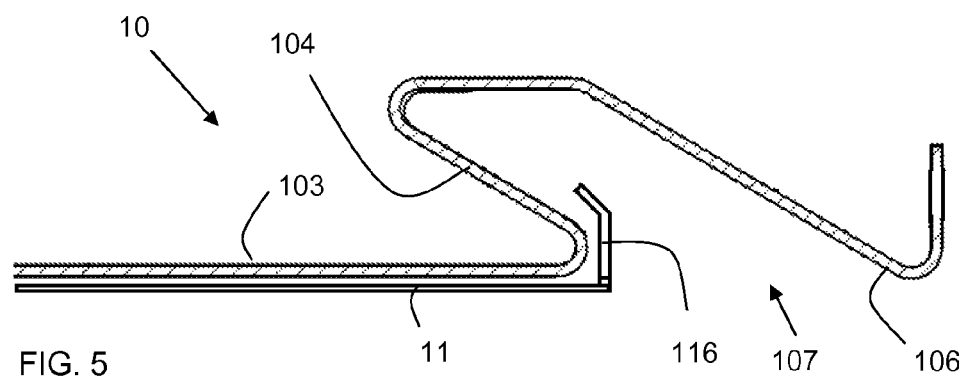
FIG. 5: shows a schematic view of another embodiment variant of the filter element according to the invention.

FIGS. 3 to 5 illustrate different embodiment variants of the filter unit 1 according to the invention, wherein the filter 101 is not shown.

The filter element 10 in FIGS. 3 to 5 corresponds to that shown in FIG. 2. A protection plate 11 is fixed to the filter element 10. Said protection plate 11 extends parallel to the baffle plate 103 and preferably bears against the latter. The size of the protection plate 11 is greater than the size of the baffle plate 103 in all three embodiment variants. The protection plate 11 accordingly overhangs the edge of the baffle plate 103. Snap-fit elements 110, positioning elements 115 or guide elements 116 are arranged on said overhang on the top side of the protection plate 11.

Referring to FIG. 3, the snap-fit element 110 includes an upward-projecting snap-fit arm which has a snap-fit lug on the inside. In this case the inside of the snap-fit arm refers to the side that faces toward the baffle plate 103. Owing to the inclination of the webs 104 of the filter element 10, which extend outward and upward from the baffle plate 103, the snap-fit element 110 can latch into place with the web 104 or engage in an aperture 105 formed between the webs 104.

Referring to FIG. 4, the positioning element 115 represents an arm directed straight upward from the protection plate 11. In this embodiment variant, the protection plate 11 is held in position by means of the positioning element 115 in the horizontal direction only. In this embodiment variant, an adhesive bond is preferably established in addition between the top side of the protection plate 11 and the underside of the baffle plate 103.

Referring to FIG. 5, the guide element 116 represents an arm directed straight upward from the protection plate 11 which is angled inward at the upper end. In this embodiment variant, the protection plate 11 can for example be pushed onto the baffle plate 103 from the side. In this embodiment variant, too, in which the angled section of the guide element 116 does not rest against the web 104 or engage in an aperture 105, an adhesive bond can be established in addition between the top side of the protection plate 11 and the underside of the baffle plate 103.

In the embodiment variants shown, a plurality of the elements 110, 115, 116 are provided, preferably distributed over the edge of the protection plate 11. The elements 110, 115, 116 can be embodied in a single piece with the protection plate 11, as shown in FIGS. 3 and 4. It is, however, also possible for the elements 110, 115, 116 to be glued onto the top side of the protection plate 11, as shown in FIG. 5.

The position of the elements 110, 115, 116 can lie within the surface area of the protection plate 11, as shown in FIGS. 3 and 4, which is to say that they can be positioned at a distance from the edge of the protection plate 11. As FIG. 5 reveals, however, it is also possible to arrange the elements 110, 115, 116 in such a way that their outside face is flush with the edge of the protection plate 11.

Figure 6:
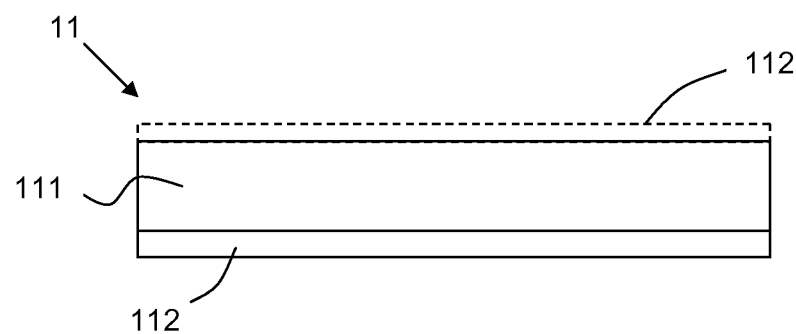
FIG. 6: shows a schematic representation of the structure of an embodiment variant of a protection plate.

Referring to FIG. 6, the structure of an embodiment variant of the protection plate 11 is shown schematically. In this embodiment variant, the protection plate 11 is made of two layers 111, 112. The layer 111 constitutes a carrier layer. Provided on the underside of the carrier layer 111 is a further layer which constitutes a coating layer 112. The thickness of the coating layer 112 is substantially smaller than the thickness of the carrier layer 111. In addition, as indicated by the dashed line in FIG. 6, a further coating layer 112 can also be provided on the top side of the carrier layer 111.

Figure 7:
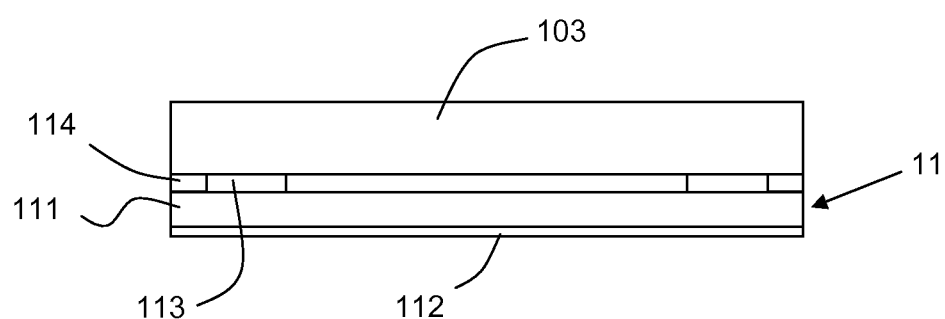
FIG. 7: shows a schematic representation of the fixing of an embodiment variant of the protection plate to the baffle plate.

Referring to FIG. 7, an embodiment variant of the protection plate 11 is shown schematically in the state fixed to the baffle plate 103. In this embodiment variant, too, the protection plate 11 is made of two layers, namely a carrier layer 111 and a coating layer 112 which is provided on the underside of the carrier layer 111 or, as the case may be, applied to the underside of the carrier layer 111.

Adhesive strips 113 are applied in the region of the edge of the protection plate 11 on the top side of the carrier layer 111, which simultaneously constitutes the top side of the protection plate 11. On the outside, toward the edge of the protection plate 11, the adhesive strips 113 are sealed by means of sealing strips 114. The protection plate 11 is joined to the underside of the baffle plate 103 by way of the adhesive strips 113 and the space between the protection plate 11 and the baffle plate 114 is sealed at the edge by means of the sealing strips 114.

The figures are not drawn to scale. The invention is not limited to the embodiment variants shown. It is also possible, for example, to use a filter element in which a separate baffle plate is associated with the filter element.

The invention has a number of advantages. In particular the panel is transparent. The panel can be embodied in color, for example by dyeing the raw material. Furthermore, the raw material fulfills the flammability requirements and thus permits the panel to be used on the underside of an extractor hood. The raw material has a certain stability which if necessary is further reinforced by the silicone hard coatings. Owing to the application of the silicone hard coating the panel is also not susceptible to stress fractures. Furthermore, the raw material is also grease-resistant, the panel having been coated by means of dip coating for example. Because of the low surface polarity, the panel is also easy to clean. Finally, the raw material affords much greater flexibility in terms of design options and finishing possibilities than is the case with other materials such as glass for example.

What is claimed is:

1. A filter unit for an extractor hood, comprising:
   at least one filter element having a front surface, a rear surface, and side surfaces, the front surface being a flow entrance of the at least one filter element;
   a baffle plate arranged in a flow direction upstream of the filter element and in front of the front surface of the filter element; and
   at least one protection plate arranged in the flow direction upstream of the filter element and the baffle plate, the at least one protection plate arranged in front of the baffle plate, the at least one protection plate coupled to the baffle plate and covering a front surface of the baffle plate, said protection plate made of at least two layers.

2. The filter unit of claim 1, wherein one of the at least two layers constitutes a coating of the other one of the layers.

3. The filter unit of claim 2, wherein the coating has a thickness in a range of 2 to 20 μm.

4. The filter unit of claim 2, wherein the coating has a thickness in a range of 4 to 10 μm.

5. The filter unit of claim 1, wherein one of the at least two layers is made of polycarbonate.

6. The filter unit of claim 1, wherein at least one of the at least two layers is a polysiloxane layer.

7. The filter unit of claim 1, wherein one of the at least two layers is a film.

8. The filter unit of claim 1, wherein the at least one protection plate has a thickness in a range of 0.5 mm to 10 mm.

9. The filter unit of claim 1, wherein the at least one protection plate has a thickness in a range of 0.5 mm to 1 mm.

10. The filter unit of claim 1, wherein the at least one protection plate has a thickness in a range of 3 to 6 mm.

11. The filter unit of claim 1, wherein the at least one protection plate is joined to the baffle plate by an adhesive bond.

12. The filter unit of claim 1, wherein the at least one protection plate is fixed to the baffle plate by a snap-fit connection.

13. The filter unit of claim 1, further comprising at least one snap-fit element formed or glued on one side of the at least one protection plate.

14. The filter unit of claim 1, wherein the at least two layers of the at least one protection plate includes:
   a carrier layer; and
   a coating layer formed on the carrier layer.

15. The filter unit of claim 14, wherein the coating layer is formed on an upstream side of the carrier layer.

16. The filter unit of claim 14, wherein the coating layer is formed on a downstream side of the carrier layer.

17. The filter unit of claim 14, wherein the coating layer is formed on an upstream side of the carrier layer and a downstream side of the carrier layer.

18. The filter unit of claim 14, wherein the carrier layer is made of polycarbonate.

19. The filter unit of claim 14, wherein coating layer is a polysiloxane layer.

20. The filter unit of claim 18, wherein coating layer is a polysiloxane layer.

21. The filter unit of claim 1, wherein the at least two layers of the at least one protection plate includes:
   a carrier layer; and
   a coating layer formed on the carrier layer, and
   wherein the carrier layer is coupled to an upstream surface of the baffle plate by an adhesive bond.

22. The filter unit of claim 21, further comprising a sealing strip at an edge of the adhesive bond between the carrier layer and the upstream surface of the baffle plate.

23. The filter unit of claim 1, wherein the at least one protection plate covers an entire surface of the baffle plate.

\* \* \* \* \*